(12) United States Patent
Feldman et al.

(10) Patent No.: US 6,792,175 B2
(45) Date of Patent: Sep. 14, 2004

(54) OPTICAL CROSSBAR SWITCH

(75) Inventors: Martin Feldman, Baton Rouge, LA (US); Ahmed El-Amawy, Baton Rouge, LA (US); Ramachandran Vaidyanathan, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 391 days.

(21) Appl. No.: 09/726,640

(22) Filed: Nov. 30, 2000

(65) Prior Publication Data

US 2001/0016096 A1 Aug. 23, 2001

(51) Int. Cl.[7] .................................................. G02B 6/35
(52) U.S. Cl. ............................ 385/17; 385/15; 385/16; 385/11; 359/497
(58) Field of Search ............................. 385/16, 17, 20, 385/21, 22, 23, 24, 11, 4, 15; 359/484, 494, 495, 496, 497; 349/196

(56) References Cited

U.S. PATENT DOCUMENTS

| | | | | |
|---|---|---|---|---|
| 3,692,385 A | * | 9/1972 | Gievers | 359/247 |
| 3,976,360 A | * | 8/1976 | Schroder | 359/303 |
| 4,013,000 A | | 3/1977 | Kegelnik | 350/96 C |
| 4,392,722 A | * | 7/1983 | Shirasaki | 359/484 |
| 4,461,543 A | | 7/1984 | McMahon | 350/383 |
| 5,013,140 A | | 5/1991 | Healey et al. | 350/347 E |
| 5,255,332 A | * | 10/1993 | Welch et al. | 385/17 |
| 5,283,844 A | | 2/1994 | Rice et al. | 385/17 |
| 5,414,540 A | * | 5/1995 | Patel et al. | 385/17 |
| 5,930,044 A | * | 7/1999 | Schleipen | 359/573 |
| 6,002,818 A | * | 12/1999 | Fatehi et al. | 385/17 |
| 6,005,697 A | * | 12/1999 | Wu et al. | 359/117 |
| 6,031,658 A | | 2/2000 | Riza | 359/301 |
| 6,134,031 A | * | 10/2000 | Nishi et al. | 359/15 |
| 6,326,600 B1 | * | 12/2001 | Christensen et al. | 250/201.1 |
| 6,477,287 B1 | * | 11/2002 | Hait | 385/15 |

OTHER PUBLICATIONS

Nelson, T., "Digital Light Deflection," Bell System Technical Journal, pp. 821–845 (May 1964).
"Small wonder: MEMS will power optical Internet," IEEE Computer (Jul. 2000).

* cited by examiner

*Primary Examiner*—David V. Bruce
*Assistant Examiner*—Chih-Cheng Glen Kao
(74) *Attorney, Agent, or Firm*—John H. Runnels

(57) ABSTRACT

A free space all-optical crossbar switches light from a plurality of sources onto a plurality of receivers, in any arbitrary permutation or combination (including one-to-one and many-to-one permutations). The sources and receivers may, for example, be single mode optical fibers. The polarization of the light from each source is controlled by a series of polarization control devices associated with the source so as to obtain desired angular deflections through a series of polarization-dependent angular deflectors in a first deflection unit. A lens may then direct the light from each source towards its desired receiver. An optional second deflection unit containing polarization control devices associated with individual receivers redirects the light so that it is incident normally on the receivers, an advantage if the receivers are single mode optical fibers. Alternative embodiments are described to reduce the number of optical components and to provide uninterrupted high speed data flow.

26 Claims, 6 Drawing Sheets

OPTICAL CROSSBAR SWITCH

This invention pertains to an all optical crossbar switch, in which each of multiple input sources is selectively connected optically to any of multiple output receivers.

In recent years increasingly large amounts of voice, video, and data have been carried by optical fibers. To minimize signal dispersion, these fibers generally support only a single optical mode each. To increase capacity large numbers of fibers are often bundled together.

Considerable effort has been made in improving methods for switching data or other signals. It is often necessary to switch data between optical fibers so that it travels correctly from its source to the proper destination. One way to switch data is to electronically detect the optical signals, and electronically switch those electronically-detected signals. New optical signals are then generated from the electronically switched signals, and are sent to appropriate output fibers. This hybrid optical-electrical-optical procedure is relatively complex, requires many optical and electronic components, and does not fully use the available optical bandwidth.

Alternatively, it is possible to switch signals solely in the optical domain, i.e., switching all of the optical signals in a fiber to the appropriate destination fiber with no intervening conversion to an electrical signal. All-optical switching should ideally be simpler, more reliable, and result in better use of bandwidth.

Prior optical crossbars, in which light propagates through integrated optical systems, are described for example in U.S. Pat. Nos. 4,013,000, 5,255,332, and 5,283,844. Prior optical crossbar switching systems have been rather complex, and have not yet fully proven themselves in practice. In the crossbar of the U.S. Pat. No. 4,013,000 patent, grating couplers selectively coupling inputs to outputs are mechanically moved between different positions by piezoelectric drivers; alternatives for mechanically moving the couplers were said to include inducing gratings by electro-optical, acousto-optical, or magneto-optical means. In the crossbar of the U.S. Pat. No. 5,255,332 patent, the reflectivity of grating couplers is altered by voltages applied to the gratings. In the crossbar of the U.S. Pat. No. 5,283,844 patent, redirection of optical signals along an optical waveguide is accomplished by means of total internal reflectance turning mirrors in which a portion of the waveguide, along with surrounding semiconductor layers, are etched to a point beneath a single quantum well and confinement layers, such that optical signals arriving at the etched facet are redirected.

U.S. Pat. No. 5,013,140 describes an N-to-1 optical switch using N deflection stages with polarization rotators and deflection means, e.g. a birefringent calcite crystal or a polarizing beam splitter, to determine which of $2^N$ inputs is selected at the output.

U.S. Pat. No. 4,461,543 describes an optical switch in which a birefringent crystal followed by a polarization rotator is used to cause arbitrarily polarized light to form two beams of the same polarization, which are then deflected to selected parallel paths. A second polarization rotator reestablishes the initial polarization, and the beams are then recombined by a second birefringent crystal.

U.S. Pat. No. 6,031,658 discloses an optical scanner using a binary optical polarization sensitive cascaded architecture having binary switchable optical plates for scanning in one, two, or three dimensions. It was said that several such scanners could be combined on a three-dimensional surface to form an N×N fiber optic switch. Each scanner apparently uses a separate lens system for correct coupling to output fibers on another three-dimensional surface. Each scanner relies on an on-chip control birefringent mode nematic liquid crystal device or birefringent plate that can be programmed to generate "any desired optical wavefront."

T. Nelson, Digital Light Deflection, Bell System Technical Journal, pp. 821–845 (May 1964) discloses a digital method of deflecting a light beam using n optical modulators and n birefringent crystals to provide $2^n$ possible output beam positions. The thicknesses of successive birefringent crystals decreased by factors of 2 to allow addressing to binary output positions. Because each crystal can displace an input from one channel into a different channel, it would be cumbersome to adapt this device for use as a switch for multiple inputs, since it would be difficult to keep different beams separated from one another after they had entered a common intermediate channel. Thus this device is well-suited for use as a multiplexer or demultiplexer, switching N channels to 1 channel, or 1 channel to N channels. However, it would be awkward to use this device as a crossbar, which is a device that can arbitrarily, simultaneously, and independently switch each of several inputs to any one of several outputs, without interference between different channels.

"Small wonder: MEMS will power optical Internet," *IEEE Computer* (July 2000) describes an all-optical switch based on mechanically controllable silicon microstructures and mirrors.

There is a continuing, unfilled need for an efficient, all-optical crossbar, suitable for switching from multiple inputs to multiple outputs, without interference between channels, and with little or no delay in the transmitted signals.

We have discovered an efficient, all-optical crossbar, in which multiple input sources are optically connected, in any desired combination (including one-to-one and many-to-one permutations), to multiple output receivers. The system is optically simple, has low insertion loss, and may be used to make connections between large numbers of inputs and outputs. It is well-adapted to switching signals on single and multiple mode optical fibers. The novel all-optical crossbar is well-suited to switching massive amounts of data between arrays of fiber optics. Such high-capacity switching will be useful, for example, in many Internet applications. The signal paths in the novel crossbar are all-optical. Electrical signals (control voltages) are used, but only for beam steering control. The signal is never converted to an electronic form during the switching. There is relatively little loss; the primary loss (at least in certain embodiments of the invention) will normally be the 3 db or so loss that results from a linear polarization of unpolarized input light.

The novel optical crossbar uses a series of deflecting elements, such as prisms or birefringent plates, to direct beams of light emitted from an input array of light sources. Each deflector deflects the light in a direction that is a function of the polarization of the light as it passes through the deflector. The deflectors deflect the light through a series of angles, so that after passing through n deflectors the light may be deflected into one of $2^n$ different angles.

The particular output to which each particular input is directed is controlled by voltages applied to several deflection units, where each deflection unit comprises an array of polarization control elements and a polarization-sensitive angular deflector, such as a polarization-sensitive deflection prism. Depending on the output address selected for a given input, a polarization control element may leave the polarization of the light unchanged, or it may rotate the plane of polarization to select a different direction of deflection in the subsequent polarization-sensitive deflector. The various polarization-sensitive deflectors preferably differ in strength (e.g., have differing thicknesses) to allow switching that corresponds to arbitrary binary addressing. Also, the deflection units preferably can deflect light in either of two directions, for example either horizontally or vertically, so that the input and output arrays may be either one-dimensional or (preferred) two-dimensional.

As an example of the geometrical optics that may be used in embodiments of this invention, consider the arrangement illustrated in FIG. 8, in which light is emitted parallel to the optical axis from eight inputs in a linear array 10. In the absence of any deflection, all rays are brought to a point 36 on the optical axis in the back focal plane of the first lens 62 and within the second lens. An exemplary ray 37 is shown from the first input to this point. Similarly, all rays deflected downwards by the first deflection unit 42 are brought to the point 38 in the back focal plane. An exemplary ray 39 is shown from the second input to the point 38. More generally, after passing through three deflection units 42 rays may be directed to any of the eight locations in the back focal plane. A second lens 62 and a second set of deflection units 42 then redirects the light to linear output array 70 so that the light is parallel to the optical axis.

Very similar considerations apply for narrow Gaussian beams, for which physical optics instead of geometric optics are used to describe the propagation of the light.

Note that the dimensions of the polarization control elements and of the polarization-sensitive deflector should be chosen so that, even when a signal experiences the maximum deflection angle, the signal stays within a single channel through the entire control array, so that different input signals are not mixed together. This novel switching of signals is possible because the differential direction used in the present invention is that which transmits the light through different selected angles. By contrast, such differential direction would be more difficult to implement with a calcite birefringent crystal that transmits the light through different parallel displacements that depend on polarization. In the latter case, multiplexing or demultiplexing (N-to-1 or 1-to-N) is possible, but a crossbar switch (N-to-N or N-to-M) may not be practical.

In a preferred embodiment, the light from all of the input sources is initially polarized in the same direction. The direction of polarization of each beam of light is individually controlled at each deflector it encounters to attain the desired deflection angle. This polarization control may be achieved, for example, with an electrically controlled device, such as a liquid crystal cell, or a Pockels or Kerr cell.

After deflection through the series of polarization-sensitive deflectors, the light is imaged onto an output array of receivers, preferably with a single lens. The receivers may, for example, be single- or multiple-mode optical fibers. A second series of polarization-sensitive deflectors and individual polarization controllers, and a second single lens may optionally be used to direct the light to the appropriate output receiver so that its chief ray is parallel to the receiver. This last step optimizes coupling to the receivers, especially in the case of single mode fibers, to minimize power loss.

The input array and output array will ordinarily have the same number of fibers, so that switching is N-to-N. However, the present invention is also well-suited for N-to-M switching where such switching may be desirable (i.e, when N≠M).

The crossbar will, generally, be insensitive to the wavelength of the light used. The crossbar preserves the wavelength of the light unaltered. The novel crossbar may thus be used in an all-optical router in which signals are first demultiplexed into separate fibers, then routed using the crossbar, and finally re-multiplexed into another set of fibers. This approach is well-suited to add-drop operations in which a selected subset of channels is replaced by a new set of channels.

BRIEF DESCRIPTION OF THE DRAWINGS

FIG. 4b depicts different areas in the polarization control devices acting as control areas for the light source array and for the receiver array, for use as part of the crossbar of FIG. 4a.

An optical crossbar switch in accordance with the present invention accepts light from a one- or two-dimensional array, for example an input array having a linear, rectangular, square, hexagonal, or other suitable geometry. FIG. 1a depicts an embodiment having a square input array 10 of light sources 12. The individual light sources may, for example, be light emitting diodes, laser diodes, including vertical cavity laser diodes, or optical fibers. A case of particular interest is shown in FIG. 1b, depicting an individual source, a single-mode optical fiber 14. An optional lens 16, one for each fiber, may be used to collimate the light leaving each fiber. Alternatively, other devices known in the art may be used to collimate the light from each fiber, such as lengths of graded index fiber (GRIN lenses) or tapered fibers.

FIG. 2 depicts an array 20 of separately controlled polarization control elements 22, in one-to-one correspondence with the individual light sources 12 of FIG. 1a (not shown in FIG. 2).

FIG. 3 depicts an optical crossbar in which the source array 10 and the receiver array 70 are well-separated. The light from each source is polarized by passing through a first polarizing sheet 44. The light then passes through a first deflection unit 40 comprising several polarization control arrays 20, and several polarization sensitive deflection prisms 42. The light from each source in array 10 is sufficiently collimated that, and the dimensions of the components of the control arrays 20, the control elements 22, and the deflection prisms 42 are such that, the light from each source remains within the corresponding control element 22 on each control array 20, without substantial crosstalk. The control elements 22 may be identical, but the control signals transmitted to each will, in general, be independent of one another, and will depend on the output location to which each light source is to be directed. An individual control element 22 may, for example be a twisted nematic liquid crystal cell using one or more individual electrodes as a controller. Other polarization control devices, including Pockels cells, Kerr cells, or ferroelectric liquid crystal cells may also be used. Pockels and Kerr cells have substantially faster response times than do liquid crystal cells, but they require much higher voltages to operate and are considerably more expensive. The response time of twisted nematic liquid crystal cells may be on the order of 1 msec., but switching may be accomplished with a voltage on the order of 1 V. The switching time of a ferroelectric liquid crystal cell can be less than 20 μsec, and its switching voltage is typically on the order of ±10 V. The controller electrodes for the liquid crystal cells may be patterned small, so that liquid crystal arrays are ideally suited for use with multiple channels.

Referring again to FIG. 3, the polarization sensitive deflection prisms 42 comprise birefringent materials that have the property of deflecting horizontally and vertically polarized light to different angles. (By contrast, an ordinary calcite crystal deflects horizontally and vertically polarized light in directions that are parallel to, but displaced from, one another.) It is preferred that prisms 42 be Wollaston prisms that deflect horizontally and vertically polarized light by the same amount, but in opposite directions. Alternatively, Rochon prisms could be used, which deflect the direction of propagation of one polarization but not the other. Wollaston and Rochon prisms may both be purchased commercially from a number of sources of optical supplies. Also, the polarization-dependent angular deflectors may have various shapes, including those of conventional prisms with flat faces, prisms with beveled faces, lenses, etc.

Alternatively, a polarization-dependent angular deflector could be constructed from an ordinary birefringent crystal, such as a calcite crystal, with mirrors or prisms placed at different angles in the path of the parallel outputs to alter the angles of those outputs.

Figure 1A:
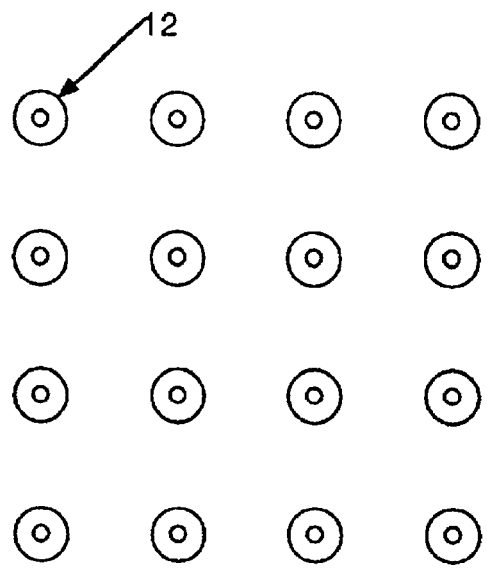
FIG. 1a depicts an array of individual light sources.
Figure 1B:
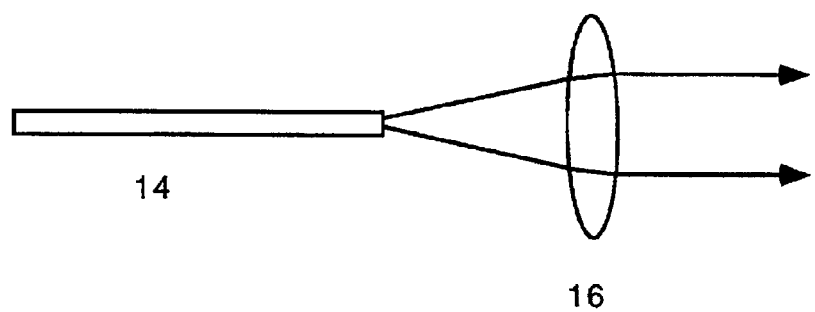
FIG. 1b depicts a single mode optical fiber source and a collimating lens.
Figure 2:
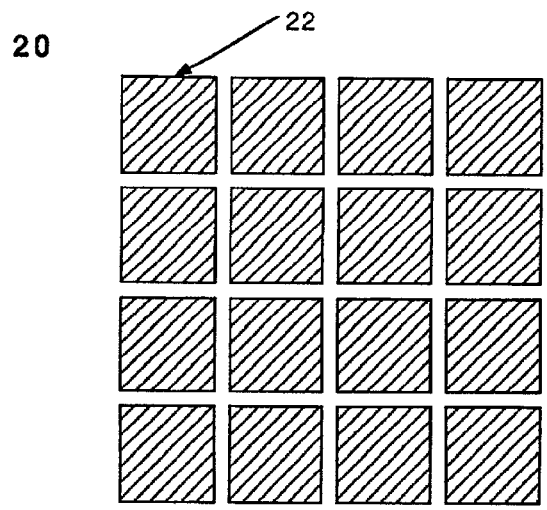
FIG. 2 depicts an array of polarization control elements.
Figure 3:
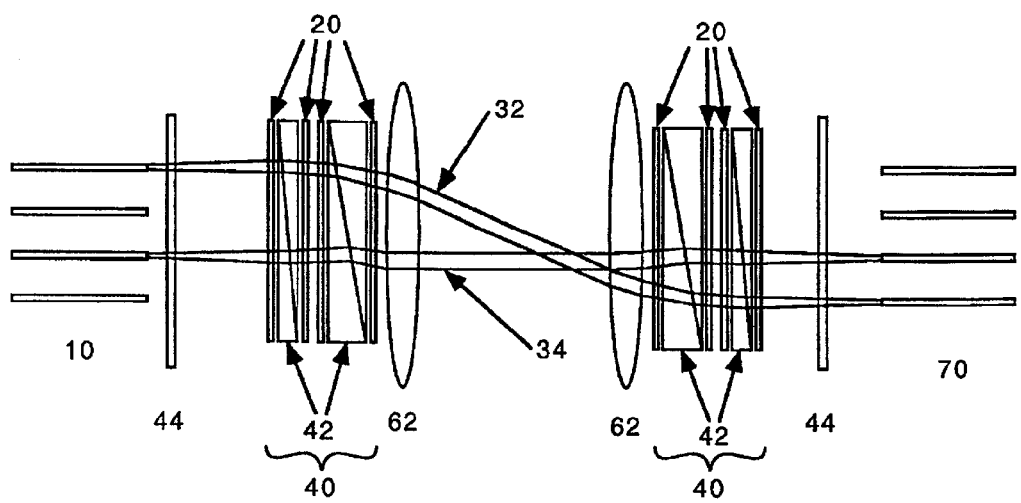
FIG. 3 depicts an optical crossbar in which the source array and the receiver array are well-separated.

An optical crossbar in accordance with the present invention will generally have multiple polarization control devices and polarization sensitive deflectors, to generate a number of possible overall deflection angles. For example, FIG. 3 depicts first deflection unit 40 as having two sets of polarization control devices and Wollaston prisms, with the second prism deflecting light by approximately twice the angle of the first. More generally, there could be several consecutive sets of polarization control devices and Wollaston prisms, with each Wollaston prism deflecting light by approximately twice the angle of the preceding prism. Depending on the settings of each of the individual control areas, the light from each individual source may thereby be deflected into any one of $2^n$ different angles by a series of n Wollaston prisms. This "powers-of-two" series of prisms is preferred, as it readily lends itself to equal binary spacings, but other configurations are also possible, including for example that in which all the prisms deflect light by the same (scalar) angle. It is also preferred in the first set of polarization-sensitive deflection prisms that the smaller deflection angle prisms (or other deflectors) should precede those with larger deflection angles, with the opposite order in the second set of prisms, because doing so minimizes the displacement within the deflection units.

In some applications it may be desirable, as shown in FIG. 3, to place an optional polarization control device 20 after each polarization sensitive deflection prism 42, in addition to the polarization control device 20 preceding the prism 42. The second polarization control device 20 returns the polarization of the light to the state it had before entering the first polarization control device 20. The second device 20 may be helpful if, for example, there is a preferred initial direction of polarization for the polarization control device 20 in the next deflection stage. In addition, the use of a second polarization control device 20 can also help reduce crosstalk by inserting an additional polarizing sheet 44 (not illustrated) after each stage to block any incorrectly polarized light that may have been deflected in an incorrect direction. If the crosstalk is low, a single final polarizing sheet 44 before the receiver array 70 may be sufficient to remove unwanted signals, as illustrated in FIG. 3.

Referring again to FIG. 3, after passing through the first deflection unit 40 the light from each individual source enters a first single lens 62, preferably spaced one (effective) focal length from the source array 10. The lens 62 collimates the light into parallel beams, directed towards the receiving elements in the output array that have been selected by the voltages applied to the polarizing control devices. As was the case for the input array, the output array may, for example, have a linear, rectangular, square, hexagonal, or other suitable geometry. Exemplary light beams 32 and 34 are emitted by the top and third sources, respectively. Light beam 32 is deflected downwards by both deflection prisms 42, and is directed to the bottom receiver in array 70. Light beam 34 is deflected upwards by the first deflection prism 42, and downwards by the second deflection prism 42. It is directed to the third receiver from the top in array 70. A second single lens 62 refocuses the light into converging beams, which are further directed towards the receiving elements by a second deflection unit 40. The optional, but preferred, second deflection unit 40 is generally similar to the first deflection unit 40, except that it functions to redirect the light so that it enters the receiving elements normally. Optional additional polarization control devices and deflection prisms may also be used to deflect light out of the plane of the paper, so that light may be transmitted and switched between two-dimensional arrays. For clarity these optional additional devices and prisms have been omitted from FIG. 3.

The receiver array 70 may comprise various light detectors or other optical elements, for example optical fibers. In particular each receiving element may include a focusing element similar to that described for the sources 12, in combination with a single mode optical fiber. Since the light enters normally, it will propagate in a single mode optical fiber with minimal loss.

Figure 4A:
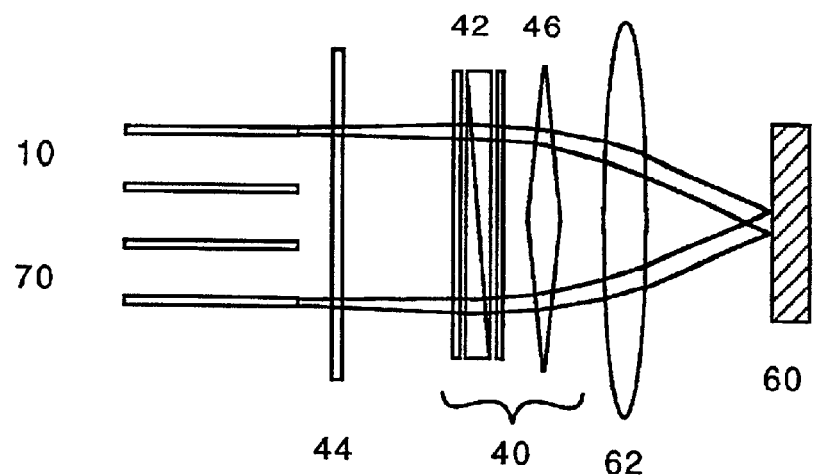
FIG. 4a depicts an optical crossbar in which the source array and the receiver array are adjacent to one another.
Figure 4B:
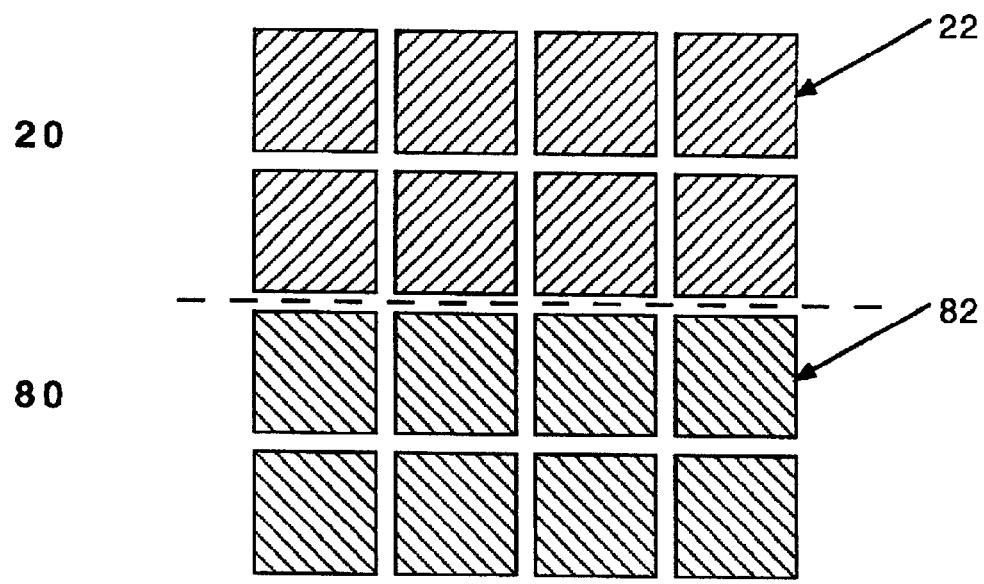

FIG. 4a shows an alternative embodiment for an optical crossbar, in which the source array 10 and the receiver array 70 are adjacent to one another. A mirror 60 may be used to reflect light back through the first lens 62 and the first deflection unit 40, with a biprism 46 replacing one of the deflection prisms. Different portions of the polarization control devices illustrated in FIG. 4b serve as separately controlled polarization areas 22 for the light source array 20, and as separately controlled polarization control areas 82 for the receiver array 80. The input array 10 and output array 70 may thus be adjacent to one another. For the same amount of separation between individual sources and receivers, only half as many sources and receivers are used in this arrangement compared with the arrangement of FIG. 3. A countervailing advantage is that only about half as many optical components are required.

Figure 5:
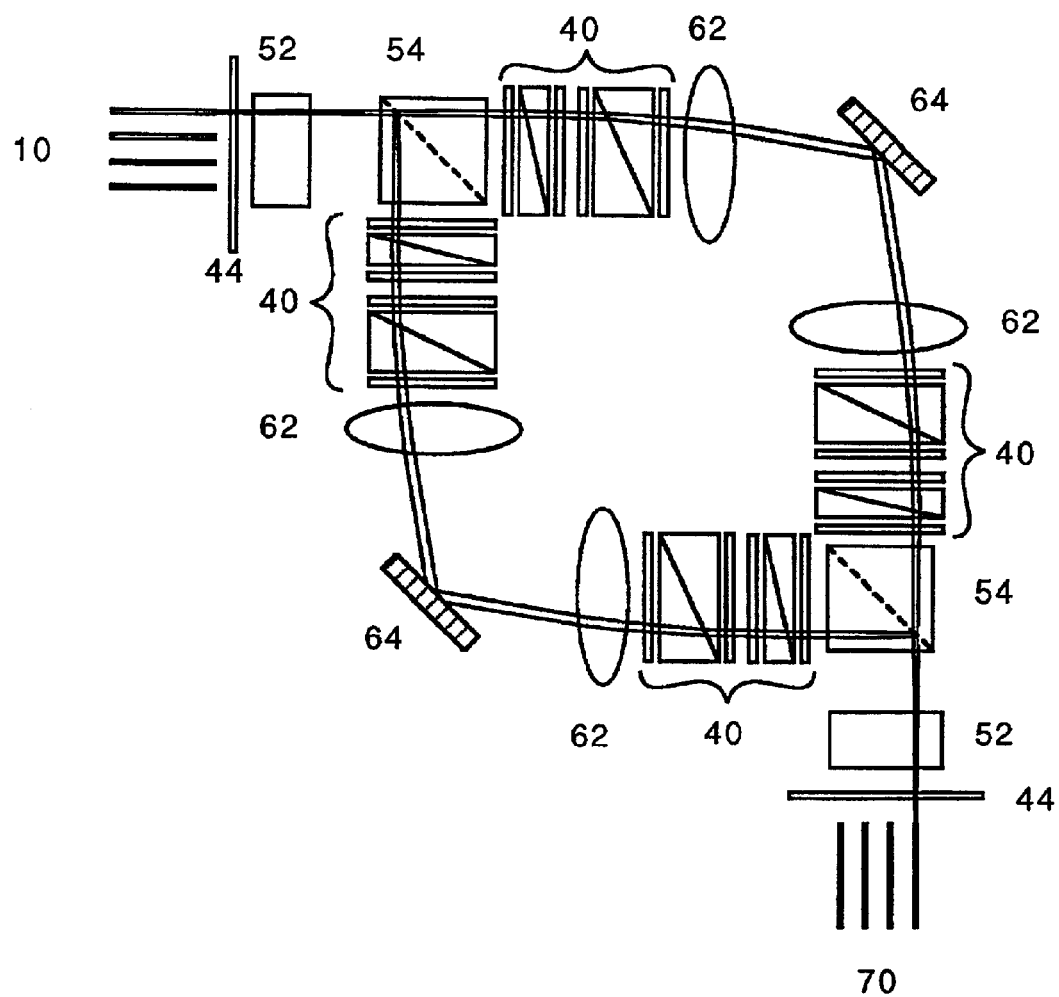
FIG. 5 depicts an optical crossbar with two paths between well separated source and receiver arrays.

FIG. 5 depicts an optical crossbar with two paths between well separated source and receiver arrays 10 and 70, respectively. A polarization control device 52 and a polarizing beam splitter 54 are inserted after source array 10, and a second polarizing beam splitter 54 and optionally a second polarization control device 52 may be inserted before the receiver array 70. A second optical path (e.g, on the lower left half of FIG. 5), essentially equivalent to the original path (e.g., on the upper right half of FIG. 5), is thereby available as an alternative route from the source array to the receiver array.

FIG. 5 shows optional mirrors 64 to fold the two optical paths so that they are conveniently recombined. An advantage of this arrangement is that one of the routes may be used when the other route is temporarily inoperable, for example while the polarizations of its polarization control elements 22 (not labeled in FIG. 5) are in the process of being switched. Thus the addition of one fast (though more expensive) polarization control device 52 can be used to achieve an essentially uninterrupted flow of high speed data, even when the remaining polarization control elements 22 used in both paths are slower but inexpensive. For example, twisted nematic liquid crystal cells may be used as the control elements 22. These liquid crystal cells are relatively inexpensive, and have a switching time on the order of 1 msec. Faster devices such as Pockels or Kerr cells may be used for polarization control device (or devices) 52. A Pockels or Kerr cell is relatively more expensive, but only one (or two) such cells would be needed for each optical crossbar, and these cells have a switching time on the order of 1 nsec or faster.

Alternatively, polarization losses may be avoided by omitting polarizing sheet 44 and polarization control device 52 from the device of FIG. 5.

In addition, either using unpolarized input light, or using an appropriate setting available on some polarization control devices 52, the polarization control devices 22 can be used to direct a single source to two receivers, effectively achieving multicasting, or to direct two sources to a single receiver, effectively creating an "OR" function. In an alternative embodiment, such an "OR"-type function could be used to achieve wavelength division multiplexing. For example, it could be used to combine signals from fibers carrying signals at different wavelengths, so that $N_1$ channels from one fiber could be combined with $N_2$ channels from a second fiber, resulting in $N_1+N_2$ channels carried on the output fiber.

Figure 6:
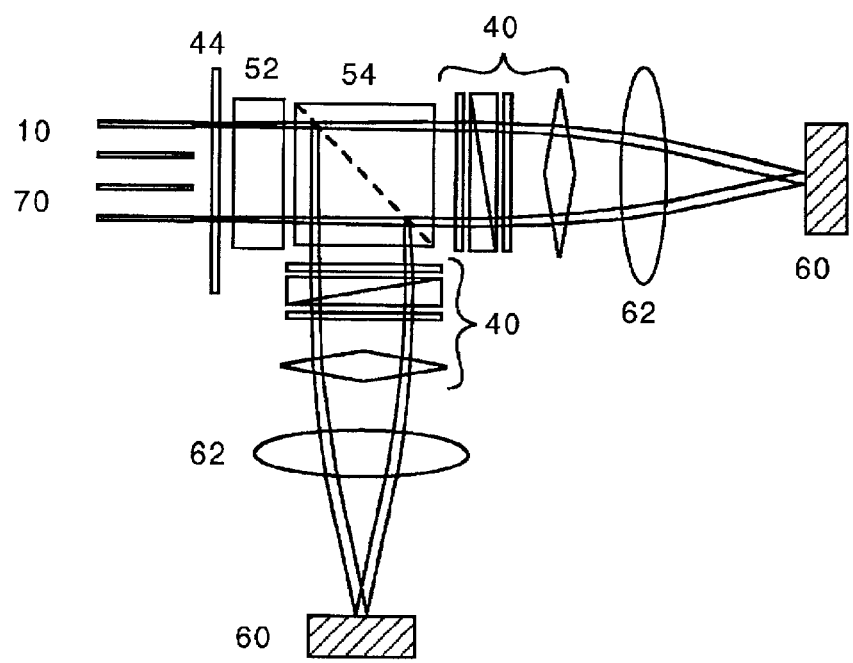
FIG. 6 shows an optical crossbar with two paths between adjacent source and receiver arrays.

The advantages of adjacent source and receiver arrays and alternative routes may be combined, as shown in FIG. 6. The device of FIG. 6 effectively combines the principles of the devices of FIGS. 4 and 5, to produce an optical crossbar with two paths between adjacent source and receiver arrays.

Figure 7:
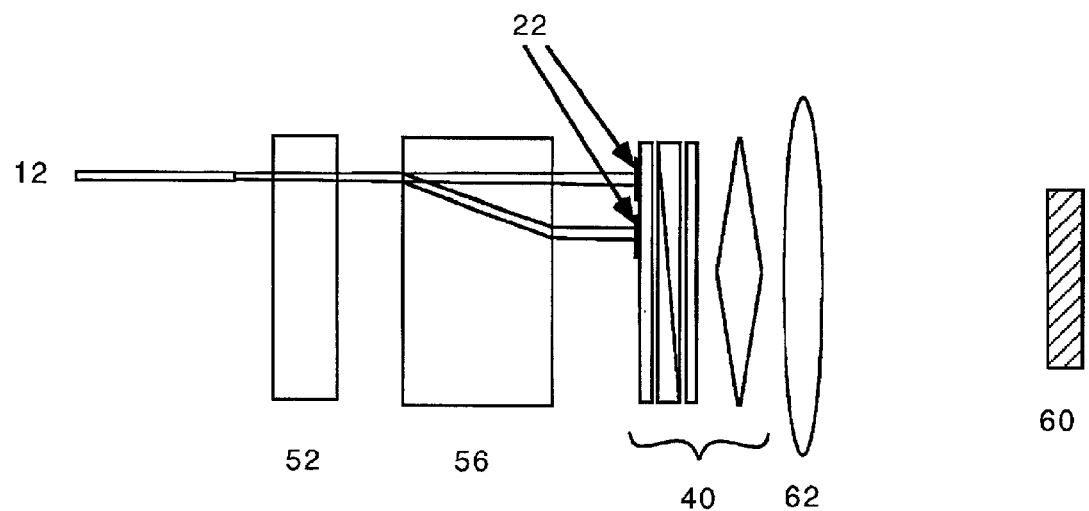
FIG. 7 shows an optical crossbar with a birefringent crystal used to select optical signal paths.
Figure 8:
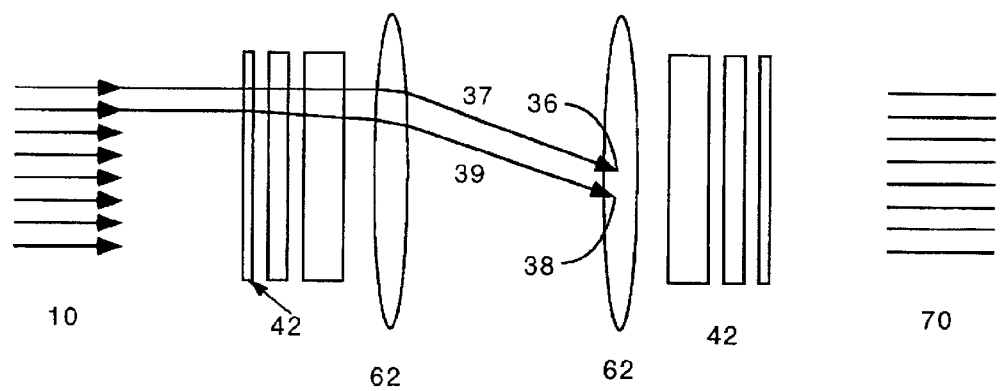
FIG. 8 illustrates the geometric optics for an embodiment of an 8-input, 8-output optical crossbar in which the sources and receivers are arranged in linear arrays.

FIG. 7 shows an optical crossbar with a birefringent crystal 56 (e.g., a calcite crystal) used to select optical signal paths. This compact embodiment uses fewer optical components. The polarizing control device 52 is combined with a birefringent crystal 56 to displace one polarization with respect to the other. Beams with different polarizations enter different, separately controlled areas 22, and then propagate through the system by different routes.

In a prototype design, signals will be switched between a pair of four-by-four arrays. The design will basically be that illustrated in FIG. 3, except that the input and output arrays 10 and 70, respectively, will be two-dimensional. The prototype will use two thin lenses 62 of 150 mm focal length, spaced 150 mm apart. Four Wollaston prisms 42 will be associated with each lens, two having thickness 15 mm, and two having thickness 7.5 mm. Each polarizing control element 22 in the arrays 20 will be a 2.25 mm square, resulting in an overall array size of 9 mm square.

Each light source 12 in array 10 will emit a parallel Gaussian beam of radius 253 microns and wavelength 1.55 microns, at a distance approximately 90 mm from the first lens 62. Of this distance, approximately 45 mm is occupied by the Wollaston prisms and polarizing control elements, with an index of refraction of approximately 1.5, so that their equivalent thickness is only about 30 mm. Thus the light sources 12 are effectively 75 mm from the first lens 62.

Assuming Gaussian beam propagation, each light beam will expand to a radius of approximately 292 microns at the position of the first lens. In addition, deflection in the Wollaston prisms will displace each beam from its axis by at most approximately 525 microns, bringing the center of the beam to within 600 microns of the edge of the 2.25 mm polarizing control elements. Since this is more than twice the beam radius, beam loss and crosstalk to the next control element will be negligible.

The radius of curvature of each expanding Gaussian beam will be approximately 300 mm at the location of the first lens. Since the lens has a focal length of 150 mm, it will refocus the beam to a converging radius of 300 mm. The beam will pass through a waist of radius 253 microns after 75 mm, halfway between the two lenses, and expand again to a 292 radius waist at the second lens. Propagation through the second optical train will mirror that through the first train.

The parameters of this prototype design are only approximate, since, for example, the above calculations neglect the thicknesses of the polarizing control elements and of the lenses. Larger margins, additional deflection stages, or both, may be obtained by increasing the focal lengths of the lenses.

Each liquid crystal polarization control element 22 will contain a twisted nematic liquid crystal between two transparent electrodes. The electrodes are treated so that in the unexcited state the liquid crystal molecules align with the respective surfaces in orthogonal directions. In this state light polarized parallel to the direction of alignment at the entrance to the cell will emerge with a polarization rotated by 90 degrees. When a voltage is applied to the electrodes, the liquid crystal molecules primarily align perpendicular to the surfaces, and then the polarization of the light is not rotated as it traverses the cell. Many liquid crystal arrays that are currently in common use for other purposes (e.g., displays) have all the elements discussed here as well as additional elements, such as additional polarizers and a mirror. Thus the ability to construct the arrays 20 of separately controlled polarization control elements 22 is well within the current state of the art.

The light paths here are reversible, so that sources and receivers may be interchanged. A given fiber can act as a source, a receiver, or both. If the sources and receivers are single or multiple mode optical fibers, light could travel in a particular direction for some pairs of coupled fibers, the opposite direction for others, and in both directions for still others.

The sources may, for example, be demultiplexed input signals. The receivers may, if desired, multiplex into the output signals. If desired, the switching can be combined with other optical ADD/DROP techniques to achieve a flexibility comparable to that of electronic switching.

Miscellaneous

As used in the specification and claims, the term "single lens" should be understood to encompass either a single simple lens or a single compound lens, the latter in contrast to an array of multiple lenses.

The complete disclosures of all references cited in this specification are hereby incorporated by reference. In the event of an otherwise irreconcilable conflict, however, the present specification shall control.

What is claimed:

1. Apparatus for optically switching light from an input array comprising a plurality of light sources to an output array comprising a plurality of light receivers; wherein said apparatus is adapted to allow light from any selected light source to be switched to any selected light receiver; and wherein said apparatus is adapted to allow light from any or all of the light sources to be thus switched independently and simultaneously; and wherein said apparatus is adapted to allow each of the light receivers thus to receive light from zero, one, several, or all of the light sources; said apparatus comprising:

(a) a series of input polarization-dependent angular deflectors, wherein the angle by which each of said input deflectors deflects incident light is a function of the direction of polarization of the light incident on said deflector; and (b) an array of input polarization control elements associated with each said input deflector, wherein each said input array comprises one input polarization control element corresponding to each light source, and wherein each said input polarization control element controls the degree, if any, to which the direction of propagation of light transmitted through said input polarization control element is altered;

wherein:

(c) said input polarization control arrays and said input deflectors are positioned so that the first said input polarization control array is adapted to transmit light from the light sources through said input polarization control elements of the first said input polarization control array to the first said input deflector; and so that each subsequent said input polarization control array is adapted to transmit light from the preceding said input deflector through said input polarization control elements of said subsequent input polarization control array to said input deflector associated with said subsequent input polarization control array; and so that the last of said input deflectors is adapted to transmit light to the light receivers;

and wherein:

(d) said apparatus is adapted to allow the switching of light from any selected light source to any selected receiver, by using said input polarization control arrays to control the direction of polarization of the light from the selected light source imposed by said input polarization control elements as the light enters each of said input deflectors, so that the net angular deflection of the light caused by all said input deflectors, which is a function of the directions of polarization of the light as it passes through each of said input deflectors, causes the light to be directed to the selected receiver.

2. Apparatus as recited in claim 1, additionally comprising:

(a) a series of output polarization-dependent angular deflectors, wherein the angle by which each of said output deflectors deflects incident light is a function of the direction of polarization of the incident light; and (b) an array of output polarization control elements associated with each said output deflector, wherein each said output array comprises one output polarization control element corresponding to each light receiver, and wherein each said output polarization control element controls the degree, if any, to which the direction of propagation of light transmitted through said output polarization control element is altered;

wherein:

(c) said output polarization control arrays and said output deflectors are positioned so that the first said output polarization control array is adapted to transmit light from the last said input deflector through said output polarization control elements of the first said output polarization control array to the first said output deflector; and so that each subsequent said output polarization control array is adapted to transmit light from the preceding said output deflector through said output polarization control elements of said subsequent output polarization control array to said output deflector associated with said subsequent output polarization control array; and so that the last of said output deflectors is adapted to transmit light to the light receivers.

3. Apparatus as recited in claim 2, additionally comprising a first single lens adapted to collimate or focus light exiting the last said input deflector, and a second single lens adapted to focus light entering the first said output polarization control array, so that light is focused as it impinges on the light receivers.

4. Apparatus as recited in claim 2, wherein said series of output polarization-dependent angular deflectors is substantially complementary to said series of input polarization-dependent angular deflectors, and wherein said array of output polarization control elements is substantially complementary to said array of input polarization control elements.

5. Apparatus as recited in claim 2, wherein said series of output polarization-dependent angular deflectors is not substantially complementary to said series of input polarization-dependent angular deflectors, or wherein said array of output polarization control elements is not substantially complementary to said array of input polarization control elements, or both.

6. Apparatus as recited in claim 2, wherein said polarization control elements are set so that light from two of the light sources is directed normally to one of the light receivers, at polarizations that are orthogonal to one another.

7. Apparatus as recited in claim 1, comprising an input array comprising a plurality of single mode optical fibers.

8. Apparatus as recited in claim 1, additionally comprising an output array comprising a plurality of single mode optical fibers.

9. Apparatus as recited in claim 1, wherein said polarization control elements comprise twisted nematic liquid crystal cells.

10. Apparatus as recited in claim 1, wherein said polarization control elements comprise at least one Pockels cell.

11. Apparatus as recited in claim 1, wherein said polarization control elements comprise at least one Kerr cell.

12. Apparatus as recited in claim 1, wherein said polarization control elements comprise at least one ferroelectric liquid crystal cell.

13. Apparatus as recited in claim 1, wherein said deflectors comprise Wollaston prisms.

14. Apparatus as recited in claim 1, wherein said deflectors comprise Rochon prisms.

15. Apparatus as recited in claim 1, wherein each of said deflectors comprises a combination of a birefringent crystal and an optical path control; wherein said optical path control is positioned in the paths of light exiting said crystal to deflect light having different polarization in different directions; and wherein said optical path control comprises one or more mirrors, one or more prisms, or one or more mirrors and one or more prisms.

16. Apparatus as recited in claim 1, wherein said apparatus is adapted to switch light from an input array to an output array that are adjacent to one another.

17. A device comprising two apparatuses as recited in claim 1, additionally comprising a fast optical switch to direct light from the input array to a selected one of said apparatuses.

18. A device as recited in claim 17, wherein said fast optical switch comprises a polarizer, a Pockels cell and a polarizing beam splitter; or wherein said fast optical switch comprises a polarizer, a Kerr cell and a polarizing beam splitter; or wherein said fast optical switch comprises a polarizer, a ferroelectric liquid crystal cell and a polarizing beam splitter.

19. A device comprising two apparatuses as recited in claim 1, wherein said device is adapted to direct light from one input array to two output arrays.

20. Apparatus as recited in claim 1, the dimensions of said deflectors, the spacings of said deflectors from one another, and the dimensions of said polarization control elements are such that there is negligible crosstalk between the light from any two light sources as the light traverses said apparatus, regardless of the net angular deflection imposed on the light from the two light sources by said apparatus.

21. Apparatus as recited in claim 1, wherein each said input deflector, other than the first said input deflector, has an angular deflection about twice the angular deflection of the preceding said input deflector.

22. Apparatus as recited in claim 1, wherein said apparatus is adapted to switch light from a one-dimensional input array to a one-dimensional output array.

23. Apparatus as recited in claim 1, wherein said apparatus is adapted to switch light from a two-dimensional input array to a two-dimensional output array.

24. Apparatus as recited in claim 1, wherein said apparatus is adapted to switch light from a two-dimensional input array to a one-dimensional output array, or to switch light from a one-dimensional input array to a two-dimensional output array.

25. Apparatus as recited in claim 1, additionally comprising an output array comprising a plurality of multi-mode optical fibers.

26. Apparatus as recited in claim 1, wherein the several input deflectors differ in strength from one another.

* * * * *